United States Patent [19]

Iwata et al.

[11] 4,039,898

[45] Aug. 2, 1977

[54] ELECTRONIC FLASH APPARATUS

[75] Inventors: Hiroshi Iwata, Osaka; Satoru Misaki, Toyonaka, both of Japan

[73] Assignee: West Electric Company, Ltd., Osaka, Japan

[21] Appl. No.: 508,651

[22] Filed: Sept. 23, 1974

Related U.S. Application Data

[62] Division of Ser. No. 405,174, Oct. 10, 1973, abandoned.

[30] Foreign Application Priority Data

| | | |
|---|---|---|
| Oct. 13, 1972 | Japan | 47-102934 |
| Oct. 20, 1972 | Japan | 47-105391 |
| Oct. 20, 1972 | Japan | 47-105393 |
| Oct. 20, 1972 | Japan | 47-105443 |

[51] Int. Cl.[2] ..... H05B 37/00; H02J 7/00

[52] U.S. Cl. ..... 315/241 P; 320/3; 354/147

[58] Field of Search ..... 315/241 P; 320/3; 354/147

[56] References Cited

U.S. PATENT DOCUMENTS

| | | | |
|---|---|---|---|
| 2,675,490 | 4/1954 | Portail | 320/3 |
| 2,818,543 | 12/1957 | Dodge | 320/3 |
| 3,443,115 | 5/1969 | Timmermah, Jr. | 307/66 |
| 3,831,079 | 8/1974 | Iwata | 315/241 P X |

*Primary Examiner*—Rudolph V. Rolinec
*Assistant Examiner*—Lawrence J. Dahl
*Attorney, Agent, or Firm*—Stevens, Davis, Miller & Mosher

[57] ABSTRACT

An electronic photographic flash apparatus which is useful as an artificial light source for taking photographs. The apparatus of this invention does not use an AC charger or the like as its power source, but it uses a plurality of secondary batteries normally held in a charged state by a primary battery, whereby when the flash apparatus is to be used, the connection of the plurality of the secondary batteries is changed to quickly charge a main discharge capacitor of the flash apparatus. By virtue of the ability of the apparatus to quickly charge its main discharge capacitor, the electronic flash apparatus in accordance with the present invention can effectively associate its operation with the operation of the shutter release of a photographic camera when it is incorporated in the latter.

6 Claims, 11 Drawing Figures

ELECTRONIC FLASH APPARATUS

This is a division of application Ser. No. 405,174, filed Oct. 10, 1973, now abandoned.

The present invention relates to improvements in electronic flash apparatus.

In a known type of camera equipped with an electronic shutter, when the illumination of an object to be photographed is lower than a predetermined value, the light quantity received by a photoconductive element decreases and the shutter speed is decreased. This gives rise to the danger of blurring due to the shaky hands and therefore a warning indicator circuit comes into operation. When this occurs, the operator sets the electronic flash apparatus to come into operation in accordance with the indication of the warning indicator circuit or alternately a three-legged support for the camera is used to prevent the occurrence of blurring due to the shaky hands when the shutter speed is low, thereby making it possible to take photographs of objects with low illumination intensities.

A disadvantage of cameras of the above type is that when the flash apparatus is set for operation, it is necessary, after the closing of the power supply switch, to reconfirm the lighting of the indicator at which the electronic flash apparatus is usable. This requires a considerable time and moreover items to be confirmed are complicated.

A further disadvantage is that if a secondary battery such as a nickel cadmium storage battery is used as a power source for the electronic flash apparatus, it has been the practice to charge the battery with the charging current of for example a 14-hour rate, thus requiring more than 12 hours for the complete charge and making it entirely useless for emergency purposes.

For this reason, quick chargers have recently been developed for practical use which incorporate a circuitry comprising, in combination, a comparison circuit composed of such elements as transistor, Zener diode and resistor elements and a controlled rectifier element such as an SCR, whereby the charging of the secondary battery up to a predetermined point is detected by measuring the terminal voltage of the secondary battery to thereby cut off the charging current to the secondary battery by means of the controlled rectifier element, e.g. the SCR and reduce the charging period for the complete charge to about 1 hour.

However, the use of such a charger involves various disadvantages such that the power supply current increases in proportion to a reduction in the charging period with a corresponding increase in the size of the power supply transformer and that the complexity of the control circuit causes the charger itself to become bulky and thus very disadvantageous from a manufacturing cost point of view.

It is therefore an object of the present invention to provide an electronic flash apparatus for photography which employs no charger of the above-mentioned type and which is equipped with a power source having a secondary battery normally maintained in a charged state by a primary battery.

It is another object of the present invention to provide an electronic flash apparatus wherein a plurality of secondary batteries are normally maintained in a charged state by a primary battery, whereby when the operation of the electronic flash apparatus is required, the connection of the plurality of secondary batteries is changed to quickly charge a main discharge capacitor of the electronic flash apparatus.

It is still another object of the present invention to provide an electronic flash apparatus wherein the above-described power source is combined with a light sensing circuit for detecting the brightness of an object to be photographed.

It is still another object of the present invention to provide an electronic flash apparatus which can be incorporated in a photographic camera, whereby the operation of the electronic flash apparatus can be effectively associated with the operation of the shutter release of the camera in response to the depression thereof. In this arrangement, the charging of the electric flash apparatus is effected by a plurality of power supply batteries connected in series to ensure a quick charging, whereby the connection of the plurality of power supply batteries is effected by the initial depression of the shutter release and the closing of the converter circuit of the flash apparatus is accomplished by the subsequent depression of the shutter release.

These and other objects, features and advantages of the present invention will become apparent from the following detailed description of the preferred embodiments of the invention taken in conjunction with the accompanying drawings, in which.

The present invention will now be described in greater detail with reference to the illustrated embodiments.

Figure 1:
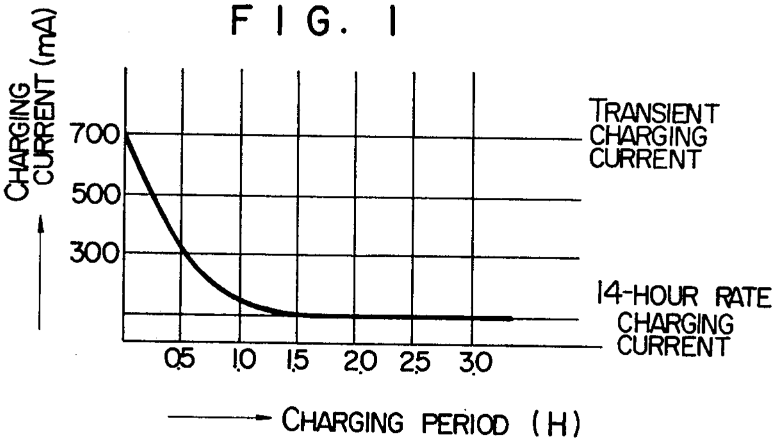
FIG. 1 is a diagram showing a typical charging characteristic of the secondary battery used in the previously described conventional apparatus.
Figure 2:
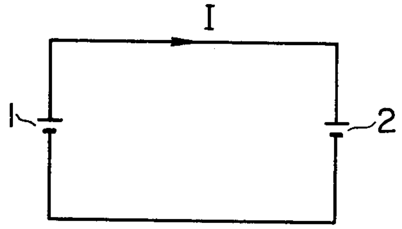
FIG. 2 is an electric wiring diagram of the power supply unit used in an embodiment of an electric flash apparatus of this invention.

Referring to FIG. 1, there is shown a charging characteristic of the secondary battery used in the previously described conventinal flash apparatus wherein the charger is provided with a comparison circuit and an SCR. FIG. 2 shows the power source used in an embodiment of the flash apparatus according to the present invention in which a secondary battery 2 such as a nickel cadmium battery is charged by a primary battery 1 such as a manganese battery and letter I indicates electric current.

Figure 3:
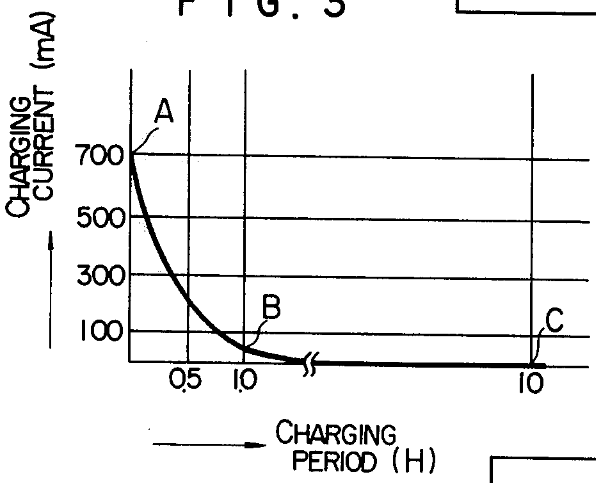
FIG. 3 is an example of the charging characteristic of the embodiment shown in FIG. 2.

If a presently available commercial AA penlight type manganese battery is used to charge two nickel cadmium storage batteries of 225 mAH which are connected in parallel, a charging characteristic as shown in FIG. 3 results. That is, a charging current of about 700 mA which is extremely higher than the 14-hour rate charging current of 20 mA–30 mA for the nickel cadmium battery is supplied at a point A during the initial stage of the charge so that after the expiration of about 1 hour, the charging current drops at a point B to 20 mA–40 mA which is the 14-hour rate charging current and it becomes a supplementary current of about 1 - 2 mA at the expiration of 10 hours, i.e., at a point C.

The above charging characteristic is quite similar to that of the presently available commercial 1-hour quick chargers and therefore this type of power source is well suited for use in portable equipments such as photographic flash light discharge tube devices incorporating a portable type power source to ensure a quick charging in minimum time. A novel feature of this type of power source is that a portable battery having a quick charging characteristic can be provided independently of AC power supply or a control circit. Moreover, by virtue of the fact that the charging current drops, after the expiration of about 10 hours, to a current value in the vicinity of the self-discharging current of a manganese battery there is no need to especially provide a switch between the primary battery and the secondary battery to disconnect the circuit.

Figure 4:
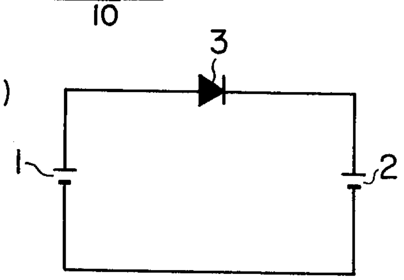
FIG. 4 is an electric wiring diagram showing another embodiment of the power supply unit used in the apparatus of this invention.

FIG. 4 shows another embodiment of the power source unit used with the apparatus of this invention in which a diode 3 is connected between the secondary battery 2 and the primary battery 1 to prevent the stored energy on the secondary battery to flow back to the primary battery side.

The present invention makes effective use of the power source of the above-described type to achieve its intended objects.

Figure 5:
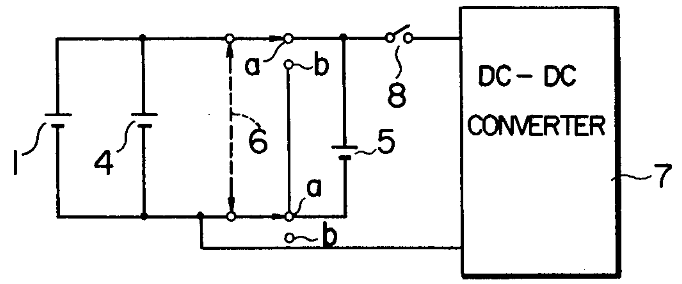
FIG. 5 is a schematic circuit diagram of the power supply unit used in another embodiment of the electronic flash apparatus of this invention.

An embodiment of the present invention will now be described in detail with reference to FIG. 5. In this embodiment, a switch for example is used to change the connection between secondary and primary batteries. In other words, a plurality of secondary batteries 4 and 5 are charged from a primary battery 1 with a switch 6 being thrown to the side of contacts *a*. When the operation of the electronic flash apparatus is required, the switch 6 is thrown to the side of the contacts *b* to connect the secondary batteries 4 and 5 in series and place the power supply batteries in condition to supply current to a DC-DC converter 7 in the electronic flash apparatus.

Figure 7:
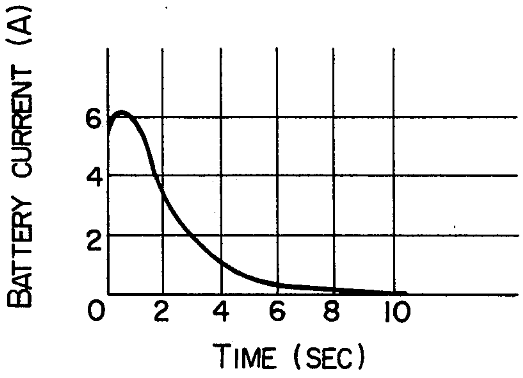
FIG. 7 is a diagram showing an example of the charging characteristic of the main discharge capacitor.

When a power supply switch 8 is closed, current flows from the power supply batteries into the DC-DC converter 7 to start charging the main discharge capacitor of the flash apparatus. Generally, during the time interval of the earlier stages of the operation of the electronic flash apparatus when practically no charging of the main discharge capacitor is taking place, the current flow from the power supply batteries assumes a very large value as shown in FIG. 7 and thus the switch 8 is overloaded. If the switch 8 is of the type havig a large contact resistance, the power loss of the switch 8 increases considerably and therefore the energy from the power supply batteries is consumed excessively. Further, there is a large possibility of causing damage to the contacts of the switch 8 when it is closed.

Further, where a battery such as a nickel cadmium battery having a very low internal resistance is employed in an effort to reduce the time required for building up the desired voltage for charging the main discharge capacitor of an electronic flash apparatus as in the above-mentioned embodiment of this invention, the current flow from the power supply batteries tends to have a very large value. Therefore, in the case of the embodiment of this invention, it is necessary to improve the power supply switch 8. According to the present invention, the above disadvantage of the power supply switch 8 is overcome by the method of FIG. 6.

Figure 6:
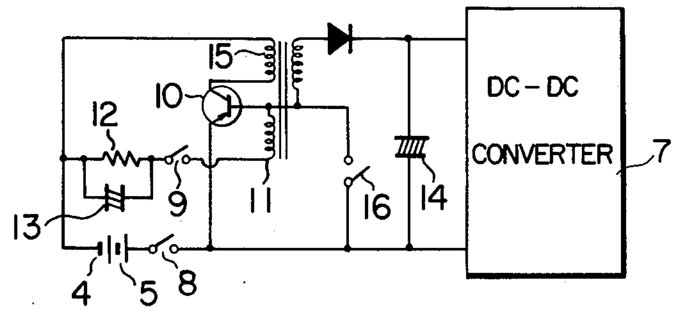
FIG. 6 is a circuit diagram showing one form of the modification of the power supply unit of FIG. 5.

In other words, a switching element 9 such as a switch is provided in a portion of the base circuit of a DC-DC converter to become equivalent with the power supply switch 8. In the DC-DC converter consisting of a conventional single transistor converter circuit having a transistor 10, a base bias for the transistor 10 is applied to a base winding 11 from the secondary batteries 4 and 5 connected in a series circuit through a bias resistor 12 and a bias capacitor 13. The large magnitude current during the initial stage of the charging of a main discharge capacitor 14 is a primary current that flows through a collector winding 15 and the emitter and the collector of the transistor 10, and the base bias current has a small magnitude of $1h_{FE}$ ($h_{FE}$ is the current amplification of the transistor 10). In the arrangement of FIG. 6, the switching element 9 is connected in series with the base circuit of the DC-DC converter so that the current flow from the secondary batteries 4 and 5 is effectively switched on and off by closing and opening the base circuit.

It will thus be seen that the basic idea of the method of FIG. 6 consists of controlling the charging of the main discharge capacitor 14 through the presence or absence of the oscillations of the DC-DC converter circuit having the transistor 10. For example, a switching element 16 such as a switch may also be connected between the base and the emitter of the transistor 10 to control the oscillations of the DC-DC converter circuit through the opening and closing of the switching element 16. In this way, the current flow to the DC-DC converter from the secondary batteries 4 and 5 is effectively switched on and off through the continuance and discontiuance of the oscillations by the closing and opening of the converter base circuit.

On the other hand, with the series-parallel transfer switch 6 which connects the secondary batteries 4 and 5 in parallel during the charging thereof and which connects them in series on supplying current to the flash apparatus, there is also the danger of causing damage to the transfer switch 6 if the opening and closing of the switch 6 are effected during the initial stage of the oscillations when a large magnitude current flows to the flash apparatus. Consequently, the danger of damage to the contacts of the switch 6 may be eliminated completely by the use of an arrangement in which a time difference is introduced between the operation of the switch 9 or 16 and the switch 6 so that the switch 6 changes in principle the secondary batteries 4 and 5 from the parallel connection to the series connection during the initial stage of the charging of the flash apparatus before the power supply switch 8, or the switching element 9 or 16 equivalent in operation with the switch 8, is closed and hence the switch 6 operates first to allow its contacts to become fixed in a stationary state.

Figure 8:
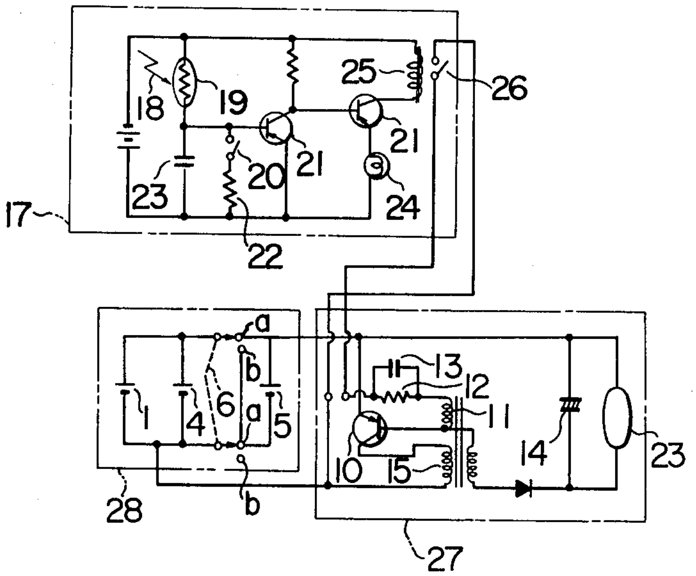
FIG. 8 is an electric wiring diagram showing an arrangement wherein still another embodiment of the present invention is incorporated in a photographic camera.

FIG. 8 illustrates one camera device which incorporates the electronic flash apparatus of this invention and in which when the illumination of an object to be photographed is lower than a predetermined value, a circuit for detecting for example a divided light information produced by a conventional light sensing circuit comprising a photoconductive element and a fixed resistor comes into operation to warn the operator of the slow shutter speed. At the same time this warning is supplied to a switching element such as a relay to automatically energize the power supply switch of the electronic flash apparatus and alow the flash apparatus to come into operation preferentially.

The construction and operation of the apparatus of FIG. 8 are as follows. In FIG. 8, enclosed by a dotted line and indicated by numeral 17 is a warning indicator circuit utilizing a part of the time constant circuit for a conventional electronic shutter. When a reflected light 18 from an object to be photographed is received by a photoconductive element 19 and a switch 20 is closed by the depression of the shutter release to cause the voltage across a resistor 22 to be applied to transistors 21, if the illumination of the object is lower than a predetermined value, a slow shutter speed warning lamp 24 is operated to give a warning. A switching element 25 such as a relay is provided in a portion of the warning indicator circuit 17 to close a switch 26, whereby the base circuit comprising the capacitor 13 and the base of transistor 10 constituting the DC-DC converter circuit in an electronic flash apparatus 27 which is indicated by a one-dot chain line is closed by the switch 26 to bring the DC-DC converter circuit into operation. Numeral 23 designates a flash discharge tube which flashes.

On the other hand, a power supply section 28 for the electronic flash apparatus is constructed so that while the primary battery 1 such as a manganese battery normally charges, through the contacts *a* of switch 6, the secondary batteries 4 and 5 consisting for example of nickel cadmium batteries and connected in parallel, when the secondary batteries 4 and 5 are to be used as a power source for the electronic flash apparatus 27, the switch 6 is thrown to the contacts *b* to connect the secondary batteries 4 and 5 in series and thereby to increase the power supply voltage. In this way, the secondary batteries 4 and 5 are used as a power source for the electronic flash apparatus 27.

It will be seen from the foregoing description of the basic operation of the arrangement of FIG. 8 that the opening and closing of the base circuit of the DC-DC converter circuit has an effect equivalent to the opening and closing of the power supply switch and there is thus the advantage of reducing the large current that flows through the conventional power supply switch and permitting the control of the opening and closing of the base circuit through the use of for example a semiconductor element. In other words, in the DC-DC converter circuit shown in FIG. 8, a base bias for the transistor 10 is applied to the base winding 11 through the bias resistor 12 and the bias capacitor 13 from the secondary batteries 4 and 5 connected in a series circuit. Therefore, a large magnitude current during the initial stage of the charging of the main discharge capacitor 14 flows as the primary current through the collector winding 15 and the emitter and the collector of the transistor 10 and this is $h_{FE}$ times the said base bias current (where $h_{FE}$ is the current amplification factor). In the conventional methods, a power supply switch is connected between the power supply batteries to control such a large magnitude current.

Figure 9:
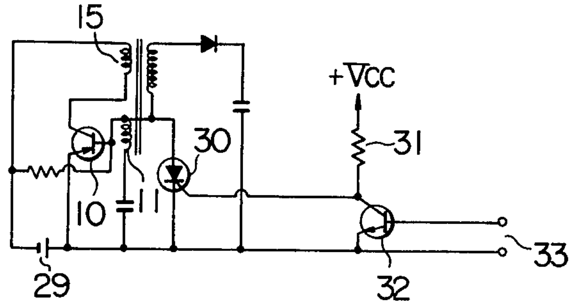
FIG. 9 is an electric wiring diagram showing a principal part of still another embodiment of the present invention.

It will thus be seen that the opening and closing of the base circuit of the DC-DC converter circuit of FIG. 8 are basically equivalent with the opening and closing of the power supply switch depending on the oscillations of the DC-DC converter circuit including the transistor 10. Thus, as shown in FIG. 9, a switching element 30 may for example be connected between the base and the emitter of the transistor 10 which is normally rendered nonconductive. As a result, current flows to the gate electrode of the switching element 30 through a resistor 31 to render the switching element 30 conductive with the result that a conduction state is established between the base and the emitter of the transistor 10 in the DC-DC converter circuit to prevent the oscillation of the transistor 10 and thus the supply of energy from a power source 29 is interrupted. When the illumination of an object to be photographed is lower than a predetermined value so that a signal generated by the light sensing circuit 17 is applied across terminals 33, a transistor 32 is rendered conductive and the switching element 30 is rendered nonconductive. Consequently, a nonconduction state is established between the base and the emitter of the oscillatory transistor 10 and the transistor 10 starts oscillating.

Figure 10:
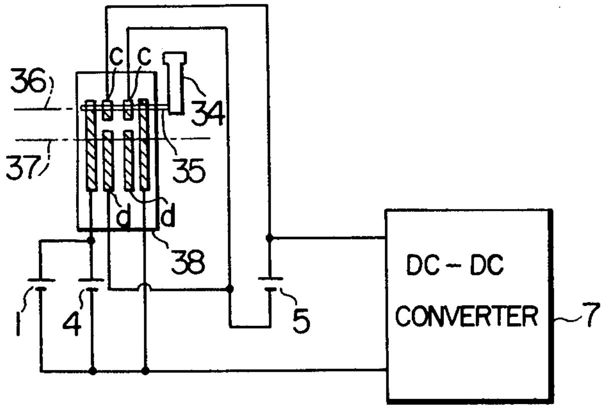
FIG. 10 is a schematic diagram showing still another embodiment of the present invention wherein the transfer of the contacts of the power supply section is associated with the shutter release.

The portion 28 which is indicated by a two-dot chain line constitutes the power supply section for electronic flash apparatus which is designed so that prior to the operation of the electronic flash apparatus the primary battery 1, e.g. a manganese battery, charges, through the contacts *a* of the switch 6, the secondary batteries 4 and 5, e.g. nickel cadmium batteries which are connected in parallel, whereas the switch 6 is thrown to the contacts *b* to connect the secondary batteries 4 and 5 in series and thereby to use them as a power source for the electronic flash apparatus. In order to take advantage of the electronic flash apparatus of this invention which is incorporated on the camera, the switch 6 may comprise a sliding contact 35 linked to a shutter release 34 of the camera shown in FIG. 10 so that during the depression of the camera shutter release 34 prior to the operation of the switch 26 for the previously mentioned switching element 25, e.g. a relay, the switch 6 is moved from the position of a chain line 36 to the position of a chain line 37 during the initial stage of the depression of the shutter release 34 to separate the contact 35 of a switch 38 from contacts *c* and engage with contacts *d*. In this way, the power supply batteries 4 and 5 are connected in series to increase the power supply voltage.

Figure 11:
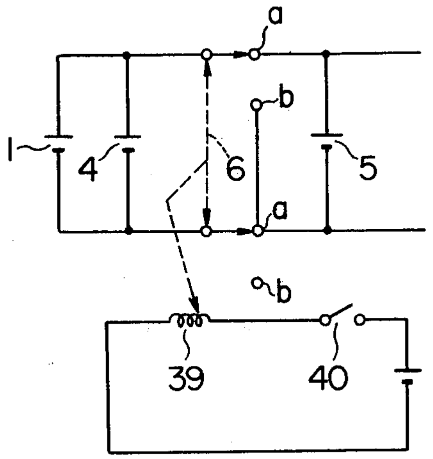
FIG. 11 is still another embodiment of the present invention wherein the transfer of the contacts of the power supply section is effected by a relay.

In this case, if the time relationship of all the switch contacts is selected so that the previously mentioned conventional light sensing circuit now comes into operation to actuate the switch 26, it is possible to prevent damages to the switch contacts which may be caused by a large magnitude current that flows through the primary side of the DC-DC converter circuit upon closing of the switch contacts. Moreover, many modifications are possible to the connection between the switch 6 and the shutter release 34. For example, as shown in FIG. 11, a switch 40 may be closed in association with the shutter release 34 so that a switching element 39 such as a relay is energized to thereby indirectly change the connection of the secondary batteries 4 and 5 by way of the relay switch 40.

While it will thus be seen from the foregoing description that various disadvantages of the conventional apparatus are overcome by the present invention, the chief advantages of the present invention will be summarized by taking the case of the power supply unit of a flash discharge tube device having the brightness of the Guide Number 16, (ASA 100), as follows:

1. While the cost of a 14 hour type charger is about 2,000 yen and a 1 hour type charger is about 6,000 yen, the present invention requires only a single low price manganese battery of 35 yen.
2. While the size of a 14-hour type charger is about 70 $cm^3$ and about 200 $cm^3$ for the 1 hour type, the present invention requires a single AA penlight type manganese battery having a volume of about 7.5 $cm^3$ which is very small, i.e., about 1/10 – 1/30 of the conventional chargers.
3. While both of the 14 hour type and 1 hour type chargers must be supplied from an AC power supply, the present invention does not require the use of an AC power supply.
4. In either case, the number of irradiations is about 40 at the full charge of the electronic flash discharge tube device. In addition to these advantages, it is possible to fully charge a plurality of secondary batteries with a single manganese battery and many remarkable advantages can be expected with a simple arrangement of the batteries.
5. An increased operating reliability and a reduced power loss are ensured for the power supply switch of the electronic flash apparatus.
6. A photographic camera device can be provided comprising a camera having a light sensing circuit operable in accordance with the illumination of an object to be photographed, and an electronic flash apparatus having a converter circuit adapted to effect the opening and closing of a power source by the opening and closing of its transistor base circuit, whereby when the illumination of the object is lower than a predetermined value, the base circuit is connected to the power source to automatically bring the electronic flash apparatus into operation. Thus, when the illumination of an object is lower than a predetermined value, the electronic flash apparatus is automatically placed in condition for operation.
7. In this type of camera device, automatic switching of the electronic flash apparatus from one operation to another as well as the transfer of the power supply batteries from the parallel connection to the series connection can be effected in the course of the depression of the shutter release.

What we claim is:

1. A photographic flash apparatus comprising: a power supply means including a plurality of rechargeable secondary cells for supplying a large discharging current to a load, a primary cell, connectable to said plurality of secondary cells, havig a small self-discharging factor and a terminal voltage higher than a final charge voltage of said secondary cells, and a first switching means for connecting said primary cell to said plurality of secondary cells; a DC-DC converter circuit including an oscillating transistor having base, emitter and collector terminals, an oscillation transformer connected to said oscillating transistor and a second switching means connected to said oscillating transistor; said power supply means being connected to an input of said DC-DC converter circuit; a primary discharging capacitor connected to an output of said DC-DC converter circuit; and a flashing discharge lamp connected in parallel with said primary discharging capacitor; said first switching means serving to connect said primary cell and said plurality of secondary cells in parallel before said DC-DC converter circuit is operated in order to charge said plurality of secondary cells with said primary cell while connecting said plurality of secondary cells in series during the operation of said DC-DC converter circuit in order to rapidly charge said primary discharging capacitor.

2. A photographic flash apparatus according to claim 1 wherein said secondary cells comprise nickel cadmium cells and said primary cell comprises a manganese cell.

3. A photographic flash apparatus according to claim 1 wherein said second switching means comprises a semiconductor switching device which controls current flowing into the base terminal of said oscillating transistor.

4. A photographic flash apparatus according to claim 3 wherein said semiconductor switching device comprises a thyristor.

5. A photographic flash apparatus according to claim 3 wherein said oscillation transformer is connected to the collector terminal of said oscillating transistor.

6. A photographic flash apparatus according to claim 1, wherein said first switch means comprises a sliding contact associated with the shutter release of a camera.

* * * * *